Patented Oct. 16, 1951

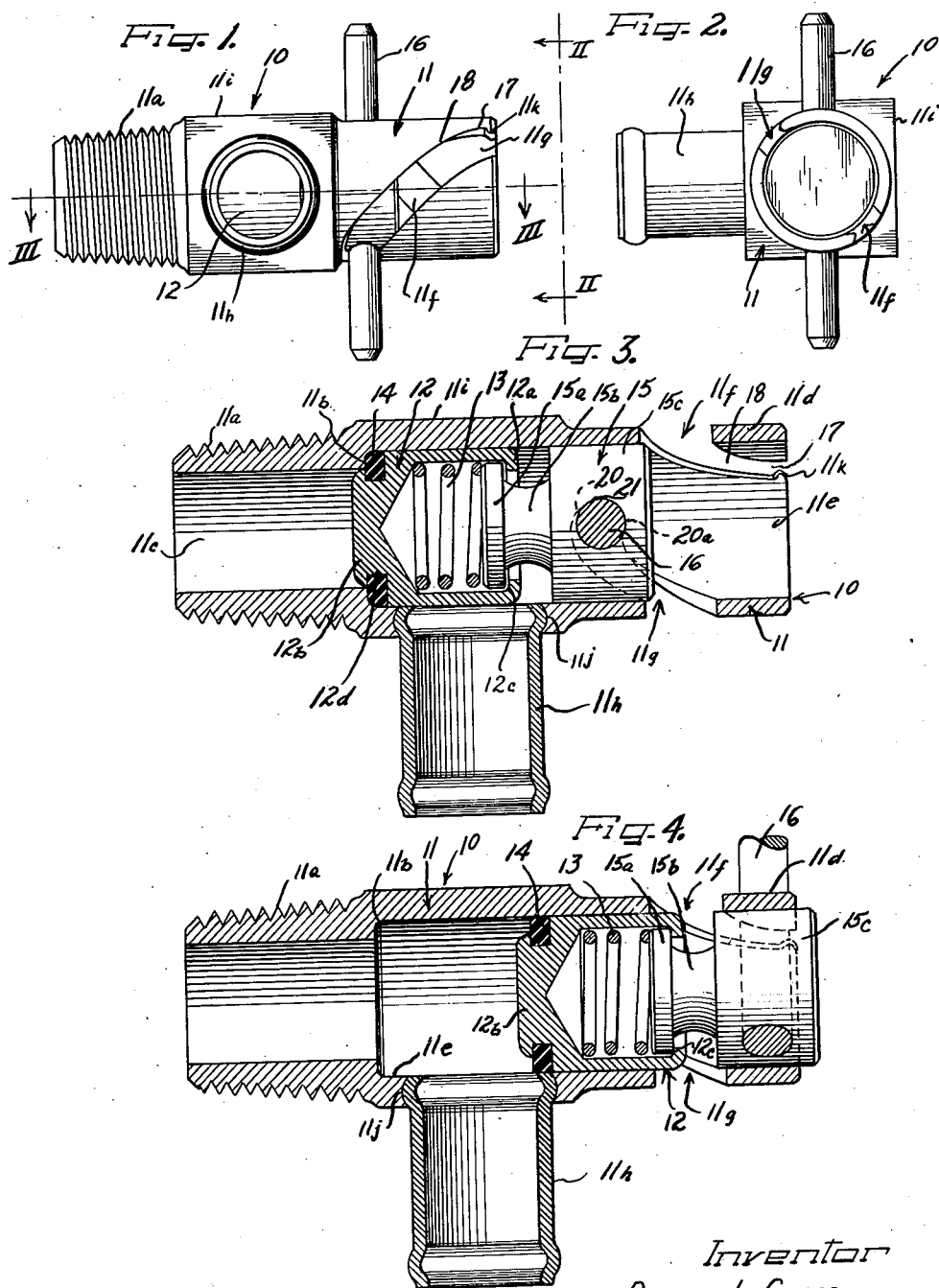

2,571,356

UNITED STATES PATENT OFFICE 2,571,356

VALVE

Richard L. Gates, Dayton, Ohio, assignor to Curtis Automotive Devices, Inc., Dayton, Ohio, a corporation of Ohio Application December 28, 1946, Serial No. 718,947

1 Claim. (Cl. 137—34)

This invention relates to angle flow shut-off valves or drain cocks.

Specifically, this invention deals with a drain valve having an open-ended hollow plug housing with a drain outlet in the side wall thereof and a valve seat between one open end of the housing and the drain outlet together with a hollow tubular valve plug slidable in the housing and controlled by a separate follower which is actuated by a handle projecting through a bayonet slot in the housing.

A feature of the invention resides in the use of a spring between the follower and the plug to resiliently urge the plug against the valve seat in the housing, and to permit relative rotation between the plug and follower for eliminating scuffing of a plug-carried seal on the valve seat.

According to the invention a hollow open-ended plug-like housing has an exteriorly threaded open end adapted to be inserted in the drain boss of a tank, radiator, a crankcase or the like and has a drain outlet in the side wall thereof together with a valve seat between the inlet and the outlet. The end of the housing remote from the threaded inlet end has bayonet slots therein. The hollow tubular valve member or plug is slidable in the housing and has a closed end wall carrying a resilient seal ring such as a rubber grommet for coacting with the seat and for riding on the inner wall of the housing to prevent leakage between the plug and housing in the open position of the valve. A follower member is slidable in the slotted end of the housing and has a handle projecting radially therefrom through the bayonet slots. This follower projects into the tubular valve member and an inturned flange on the valve member provides a shoulder that is abutted by the follower to pull the valve member to opened position. A spring is interposed between the closed end of the valve and the follower for urging the seal ring against the valve seat when the handle on the follower is moved to the inner end of the bayonet slots.

In the closed position of the valve, the follower is spaced inwardly of the shoulder provided by the inturned flange of the valve so that the spring is compressed more in the closed position than in the open position of the valve. This spacing of the follower from the shoulder of the valve permits rotation of the follower by its operating handle in the bayonet slots without rotating the valve-carried seal ring against the valve seat. This arrangement protects the seal ring. The inner ends of the bayonet slots are recessed to lock the follower handle so that the valve will be maintained in closed position. When the handle is manually rotated out of the recess, the follower will retract the valve away from its seat by engaging the shoulder in the valve, and movement of the follower handle to the outer ends of the bayonet slots will move the valve beyond the opening in the side wall thereby connecting the inlet and outlet of the valve housing. The seal ring on the valve sealingly engages the valve housing and prevents leakage past the valve through the slotted end of the housing.

It is, then, an object of the invention to provide an angle flow valve, suitable for draining radiators, tanks, crankcases, and the like embodying a hollow open-ended tubular housing with a drain channel in its side wall, a hollow tubular cup-like plug slidable in the housing and having a closed end carrying a rubber grommet to coact with a valve seat in the housing for sealingly separating the inlet and outlet of the housing, together with a plug-actuating follower slidable in the housing and controlled by a handle which projects through bayonet slots in the housing.

Another object of the invention is to provide a drain valve or the like with separate valve and follower members accommodating relative rotation to protect a valve-carried sealing ring against scuffing on the valve seat in a housing.

Another object of the invention is to provide an angle drain valve with a valve member held in closed position by a compression spring which is subjected to increased compression whenever the valve is closed.

Another object is to provide an angle flow drain valve with a seal ring-carrying valve member that not only sealingly separates the inlet and outlet of the valve in the closed position of the valve member, but also prevents leakage out of one end of the valve in the open position of the valve member.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a drain valve according to this invention illustrating the valve in closed position.

Figure 2 is an end elevational view along the line II—II of Figure 1.

Figure 3 is an axial cross-sectional view along the line III—III of Figure 1 and showing a part in elevation.

Figure 4 is an axial cross-sectional view similar to Figure 3 but illustrating the valve in opened position.

As shown on the drawings:

The drain valve 10 of this invention, as shown in Figures 1 to 4, includes a tubular open-ended plug housing 11, a recessed or cup-shaped cylindrical valve member 12 slidable in the housing 11, a spring 13 in the valve member 12, a rubber grommet or sealing ring 14 surrounding the closed end of the valve 12, a follower 15 slidable in the housing and having a portion thereof extending into the valve 12 to abut the spring 13, and a handle 16 projecting from the follower 15.

The housing 11 has an externally threaded portion 11a at one end thereof for threaded engagement in a tank, radiator, crankcase, or the like. A valve seat 11b is formed in the housing 11 adjacent the threaded end 11a thereof. A cylindrical bore 11c extends through the threaded end 11a to the valve seat 11b. The housing has a cylindrical portion 11d remote from the threaded end portion 11a and a counterbore 11e extends through this end portion 11d and through the central portion of the housing to the valve seat 11b. Diametrically opposed bayonet slots 11f and 11g extend inwardly from the open end of the portion 11d. Each bayonet slot 11f and 11g has a portion 17 extending axially inward from the open end of the portion 11d to a relatively steep inclined portion 18. The inclined portions 18 of the slots 11f and 11g extend in opposite directions on opposite sides of the portion 11d and terminate in inner transverse portions 20. The portions 20 of each slot are offset from the portions 17 and each portion 20 has a seating face providing a recess that is somewhat axially offset from the inner end of the sloping portions 18 in a direction toward the outer end of each slot. This provides a locking recess which will retain the handle 16 therein. The bayonet slots 11f and 11g are thus arranged to provide cams for the handle 16 which guide the follower 15 first in a straight axial direction along the portions 17 of the slots, and then rotate the follower 15 about a quarter of a turn along the oppositely inclined portions 18 of the slots while further advancing the follower 15 in an axial direction to the recesses 21 which, as explained above, retain the handle and hold the valve in its fully closed position. At the inner ends of the slots, the handle 16 is guided by the substantially transverse portions 20 of the slots in a direction for rotating the follower 15 without substantially advancing it in an axial direction. As the handle is seated on the seating faces 20a of the recesses 21, the follower 15 backs up axially a slight distance so that the handles will become locked in the recesses.

The housing 11 has a drain tube 11h anchored in a drain outlet in the side wall of the central portion 11i of the housing. This portion 11i, as shown in Figure 2, is of square configuration and preferably has a number of flat wrench-engaging sides so that the housing can be easily threaded into a drain boss. The tube 11h, as shown in Figures 3 and 4, is spun into a concave hole 11j through a flat side of the intermediate portion 11i of the housing and extends at right angles to the axis of the housing. It should be understood, however, that this tube 11h could extend in any angular relationship relative to the axis of the housing, and that the drain channel provided thereby could be formed integrally with the housing. Alternatively, of course, the tube 11h could be entirely omitted, and drainage could occur directly through a side opening, such as 11j, in the housing.

Metal from the open end of the portion 11d of the housing is preferably pinched or staked into at least one of the slots, such as the slot 11f, to form a projection or nib 11k at the free end of the axial portion of the slot. This nib 11k forms a stop for the handle 16 thereby preventing the follower from dropping out of the housing.

The valve member 12 is in the form of a cylindrical cup with an inturned flange 12a around the open mouth thereof remote from the closed end 12b. The flange 12a provides a shoulder 12c in the cup adjacent the open end of the cup. The closed end 12b of the cup has a peripheral groove 12d therearound bounded by radial side walls. One of these side walls extends to the major diameter of the valve while the other side wall terminates at a reduced diameter so that the forward end of the closed portion 12b of the valve can project into the bore 11c of the housing. The grommet 14 seated in the groove 12d thus has its forward face exposed for engaging the valve seat 11b while its back face is entirely covered by the opposite side wall of the groove. This arrangement prevents tilting of the grommet in the groove even though the grommet is seated against the valve seat with considerable force.

The follower 15 has a head portion 15a fitting in the cup valve 12 and adapted to thrust against the shoulder 12c at the open end of the cup. The head 15a bottoms the spring 13. The other end of the spring is bottomed on the cup. A reduced-diameter neck portion 15b of the follower fits freely through the open end of the cup in spaced relation inwardly of the flange 12a and extends to a cylindrical body portion 15c slidably seated in the counterbore 11e. The handle 16 extends transversely through this body 15c and through the slots 11f and 11g as described above.

The valve 12 and the body 15c of the follower 15 slide freely in the counterbore 11e, and are of sufficient length so that they will not cock and become jammed in the housing.

In the closed position of the valve, the grommet 14 is tightly held against the valve seat 11b in sealing engagement therewith by the spring 13, which is compressed more than in any other position of the valve because, as shown in Figure 3, the follower head 15a is lifted off of the shoulder 12c when the handle 16 is locked in the recesses 21 of the slots 11f and 11g. As soon as the grommet 14 engages the seat 11b in the closing operation of the valve, continued closing movement of the follower compresses the spring 13 and frees the head 15a of the follower from the valve thereby permitting rotation of the follower without rotating the valve. The feature of eliminating rotation of the valve when its seal engages the valve seat prevents scuffing of the seal and insures a longer wear life.

When it is desired to open the valve, the operating handle 16 is first depressed to clear the seating faces 20a of the slot recesses 21, the handle is then rotated out of the recesses, and pulled toward the free open end of the portion 11d of the housing. This pulling of the handle draws the head 15a of the follower against the shoulder 12c of the valve to retract the valve to the opened position shown in Figure 4. In this opened position, the sealing ring or grommet 14 is preferably positioned beyond the drain channel afforded by the outlet tube 11h and the inlet bore 11c of the housing is thereby placed in full communication with the drain conduit through a portion of the counterbore 11e. The sealing ring 14 preferably engages the counterbore 11e in sealing relation to prevent leakage between the valve 12 and the counterbore even in the opened position of the valve. This sealing relationship imparts some friction to sliding movement of the valve and this feature may be utilized to hold the valve in open position. Normally, however, the hydraulic head of fluid draining through the housing will tend to force the valve to its opened position as soon as the spring pressure on the valve is released, as when the handles are removed from the locking recesses of the slots.

From the above descriptions it will be clear that the invention provides an angle flow valve with a slidable valve member controlled through a slidable follower in such a manner as to eliminate rotation of the valve on its seat. Closing force on the valve is transmitted through a resilient spring which can be loaded as desired. The spring loading of the valve also makes possible the use of the valve as a safety relief valve, since the valve member can open when subjected to pressures above the load on the spring.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A valve comprising a hollow open-ended plug housing having an externally threaded end portion, an opposite end portion provided with opposed arcuate radially extending bayonet slots having locking recesses at the closed inner ends thereof, and a drain outlet intermediate said ends, the slotted end portion of the housing having a counterbore bottoming at a valve seat intermediate the threaded end of the drain outlet, a hollow tubular valve member slidably mounted in the counterbore of the housing and having a closed end adjacent the valve seat of the housing and an open end defined by an inturned shoulder, a resilient seal ring carried around said closed end for cooperation with the valve seat, a follower having a body portion slidable in the counterbore of the housing, a neck freely projecting into said valve member and a head slidable and rotatable in said valve member for engagement with the inturned shoulder of the valve member, operating means carried by the body of the follower and projecting radially through the bayonet slots in the slotted end portion of the housing, and spring means enclosed within the hollow valve member and seated against the closed end of said valve member for cooperation with the head of the follower to move the seal ring against the valve seat in the housing for sealingly separating the opening in the threaded end of the housing from the drain outlet to close the valve, said follower being further actuated toward said valve seat after closing of the valve and movement of said operating means into said locking recesses to tension said spring means, thus urging the valve member against said seat and urging said operating means into said locking recesses.

RICHARD L. GATES.

REFERENCES CITED

The following references are of record in the file of this patent:

UNITED STATES PATENTS

| Number | Name | Date |
|---|---|---|
| 614,517 | Taylor | Nov. 22, 1898 |
| 1,187,527 | Houser | June 20, 1916 |
| 1,296,897 | Yoemans | Mar. 11, 1919 |
| 1,416,175 | Couch | May 16, 1922 |
| 1,503,132 | Prator | July 29, 1924 |
| 1,626,089 | Jakosky | Apr. 26, 1927 |
| 1,954,986 | Carlson | Apr. 17, 1934 |
| 1,964,835 | Wheaton | July 3, 1934 |
| 2,392,800 | Osburn | Jan. 8, 1946 |